(12) United States Patent
Boyd

(10) Patent No.: US 12,048,396 B2
(45) Date of Patent: Jul. 30, 2024

(54) COVER FOR AN EATING UTENSIL

(71) Applicant: Robert Scott Boyd, Oklahoma City, OK (US)

(72) Inventor: Robert Scott Boyd, Oklahoma City, OK (US)

( * ) Notice: Subject to any disclaimer, the term of this patent is extended or adjusted under 35 U.S.C. 154(b) by 0 days.

(21) Appl. No.: 18/525,302

(22) Filed: Nov. 30, 2023

(65) Prior Publication Data
US 2024/0090708 A1 Mar. 21, 2024

Related U.S. Application Data

(63) Continuation of application No. 16/864,757, filed on May 1, 2020, now abandoned.

(60) Provisional application No. 62/841,477, filed on May 1, 2019.

(51) Int. Cl.
| | | |
|---|---|---|
| *A47J 47/16* | (2006.01) | |
| *A47G 29/087* | (2006.01) | |
| *A47G 21/02* | (2006.01) | |
| *A47G 21/04* | (2006.01) | |
| *A47G 21/06* | (2006.01) | |
| *A47G 21/14* | (2006.01) | |

(52) U.S. Cl.
CPC ............ *A47J 47/16* (2013.01); *A47G 29/087* (2013.01); *A47G 21/02* (2013.01); *A47G 21/04* (2013.01); *A47G 21/06* (2013.01); *A47G 21/14* (2013.01); *A47G 2400/025* (2013.01)

(58) Field of Classification Search
CPC . A47J 47/16; A47G 29/087; A47G 2400/025; A47G 2400/02; A47G 21/02; A47G 21/023; A47G 2021/002; A47G 21/04; A47G 11/001; A47G 21/14; A47G 21/06; B65D 5/009; B65D 5/5213; B65D 43/16; B65D 65/22; B65D 65/02
USPC .......................................... 30/143
See application file for complete search history.

(56) References Cited

U.S. PATENT DOCUMENTS

| | | | | |
|---|---|---|---|---|
| 34,712 | A * | 3/1862 | Cables | B26B 11/00 30/143 |
| 920,235 | A * | 5/1909 | Aagaard | B26B 11/00 30/143 |
| 1,002,094 | A * | 8/1911 | Theriault | A61J 7/0023 30/326 |
| 1,220,559 | A * | 3/1917 | Riebe | A47G 21/14 206/553 |
| 1,423,483 | A * | 7/1922 | Ludlum | G09F 5/02 206/553 |
| 1,521,656 | A * | 1/1925 | Simpson | A47G 21/02 206/349 |

(Continued)

FOREIGN PATENT DOCUMENTS

WO   WO 2005/074352   8/2005

OTHER PUBLICATIONS

CutlerySleeves.com, Retrieved from the Internet: URL: http://www.cutlerysleeves.com/ [Retrieved Apr. 4, 2018].

*Primary Examiner* — Devin K Barnett
(74) *Attorney, Agent, or Firm* — Dunlap Codding, P.C.

(57) ABSTRACT

A cover for an eating utensil having a head opposite a handle. The cover has a sleeve with a closed end and an open end for receiving the head of the eating utensil. A tab extends from the open end of the sleeve. The tab may have an adhesive on an inner side for adhering the tab to a portion of the handle when the head is positioned in the sleeve.

5 Claims, 3 Drawing Sheets

(56) References Cited

U.S. PATENT DOCUMENTS

| | | | | |
|---|---|---|---|---|
| 2,109,016 A * | 2/1938 | Ringer | A47G 21/06 |
| | | | D7/645 |
| 3,287,806 A * | 11/1966 | Kellerman | A47G 21/004 |
| | | | 206/229 |
| 3,911,578 A * | 10/1975 | Ushkow | A61J 7/0023 |
| | | | 215/DIG. 5 |
| 4,061,783 A * | 12/1977 | Hoffman | B65D 75/325 |
| | | | 426/115 |
| 4,377,035 A * | 3/1983 | Dalichow | A47G 21/06 |
| | | | 30/147 |
| 4,800,108 A * | 1/1989 | Swartz | A47G 11/00 |
| | | | 206/548 |
| 4,805,818 A * | 2/1989 | Harrison | B26B 29/025 |
| | | | 224/232 |
| 4,856,192 A * | 8/1989 | Collins | B26B 29/025 |
| | | | 224/232 |
| 5,011,017 A * | 4/1991 | Giesen | B31D 1/04 |
| | | | 206/553 |
| 5,244,025 A * | 9/1993 | Wewers | A45C 11/00 |
| | | | 206/553 |
| 5,699,907 A * | 12/1997 | Langenstuck | B26B 29/025 |
| | | | 206/349 |
| 5,868,771 A * | 2/1999 | Herbert | A61B 17/3213 |
| | | | 30/162 |
| 6,308,419 B1 * | 10/2001 | Neshat | B26B 29/025 |
| | | | 30/286 |
| 7,434,316 B2 * | 10/2008 | Nenadic | B26B 29/025 |
| | | | 30/143 |
| D596,043 S * | 7/2009 | Noble | D9/702 |
| D698,208 S * | 1/2014 | Cavanagh | D7/637 |
| 9,039,058 B1 * | 5/2015 | Henry | A47G 21/02 |
| | | | 294/131 |
| 9,156,580 B2 * | 10/2015 | Ladanyi | A47G 21/14 |
| 10,414,056 B2 * | 9/2019 | Lee | B26B 9/00 |
| 2002/0073553 A1 * | 6/2002 | Yang | A47G 21/06 |
| | | | 30/151 |
| 2003/0093100 A1 * | 5/2003 | Robinson | A61B 17/3213 |
| | | | 606/167 |
| 2005/0236291 A1 * | 10/2005 | Torkelson | B43K 29/20 |
| | | | 206/267 |
| 2006/0000314 A1 * | 1/2006 | Henry | B21D 53/64 |
| | | | 76/104.1 |
| 2007/0041820 A1 * | 2/2007 | Simons | G01G 19/083 |
| | | | 414/647 |
| 2008/0017544 A1 * | 1/2008 | Amsden | A45C 11/20 |
| | | | 206/541 |
| 2008/0092395 A1 * | 4/2008 | Belanger | B65D 75/002 |
| | | | 30/322 |
| 2008/0149634 A1 * | 6/2008 | Osborne | A47G 21/145 |
| | | | 220/521 |
| 2008/0264532 A1 * | 10/2008 | Wilson | A47G 21/00 |
| | | | 150/154 |
| 2010/0044271 A1 * | 2/2010 | McMillan | A47G 11/001 |
| | | | 206/553 |
| 2010/0175555 A1 * | 7/2010 | Ferrer | D01F 6/80 |
| | | | 428/401 |
| 2010/0247908 A1 * | 9/2010 | Velev | D01F 1/10 |
| | | | 264/165 |
| 2011/0251631 A1 * | 10/2011 | Trees | A61B 17/3211 |
| | | | 606/167 |
| 2012/0261292 A1 * | 10/2012 | Lieb | B65D 75/38 |
| | | | 53/461 |
| 2013/0270330 A1 * | 10/2013 | Godley | B65D 75/02 |
| | | | 229/87.01 |
| 2014/0259684 A1 * | 9/2014 | Barber | A47J 43/288 |
| | | | 30/143 |
| 2014/0276330 A1 * | 9/2014 | Costa | A61F 5/0036 |
| | | | 606/198 |
| 2015/0028184 A1 * | 1/2015 | Moore | A47J 45/00 |
| | | | 248/688 |
| 2015/0320499 A1 * | 11/2015 | Ma | A61B 50/30 |
| | | | 206/363 |
| 2019/0194847 A1 * | 6/2019 | Schoots | D04H 1/56 |
| 2020/0254371 A1 * | 8/2020 | Yung | A62B 23/02 |
| 2020/0345183 A1 * | 11/2020 | Boyd | A47J 47/16 |
| 2021/0052096 A1 * | 2/2021 | Leatherman | A47G 23/0216 |
| 2021/0213633 A1 * | 7/2021 | Chaudhary | B26B 29/025 |
| 2022/0022674 A1 * | 1/2022 | Chuang | A47G 21/04 |
| 2022/0048313 A1 * | 2/2022 | Gibson | B43K 23/00 |
| 2022/0288963 A1 * | 9/2022 | Owusu | B43K 23/00 |

\* cited by examiner

COVER FOR AN EATING UTENSIL

CROSS-REFERENCE TO RELATED APPLICATIONS

This application is a continuation of U.S. Ser. No. 16/864,757, filed on May 1, 2020, which claims priority to U.S. Provisional Application Ser. No. 62/841,477, filed on May 1, 2019; the entire contents of each being hereby expressly incorporated herein by reference.

BACKGROUND

Eating utensils, namely knives, forks, and spoons, are staples of tableware in the restaurant industry. Restaurants turn over hundreds of customers a day with little time to properly clean table tops between customers. Eating utensils are often washed and then rolled in napkins at the end of a restaurant shift to be given to customers or placed on tables awaiting customers the next day. Upon arrival at the table, a customer usually unrolls the eating utensils from the napkin, places the napkin in his or her lap, and sets the eating utensils on the table, which may have briefly been wiped with an unclean rag before the customer sat at the table. The germs from the table therefore transfer to the eating utensils and in turn to the customer's mouth.

A need exists for a clean barrier between eating utensils and dirty surfaces, such as restaurant tables. It is to such a barrier that the inventive concepts disclosed herein are directed.

DETAILED DESCRIPTION OF EXEMPLARY EMBODIMENTS

Figure 1:
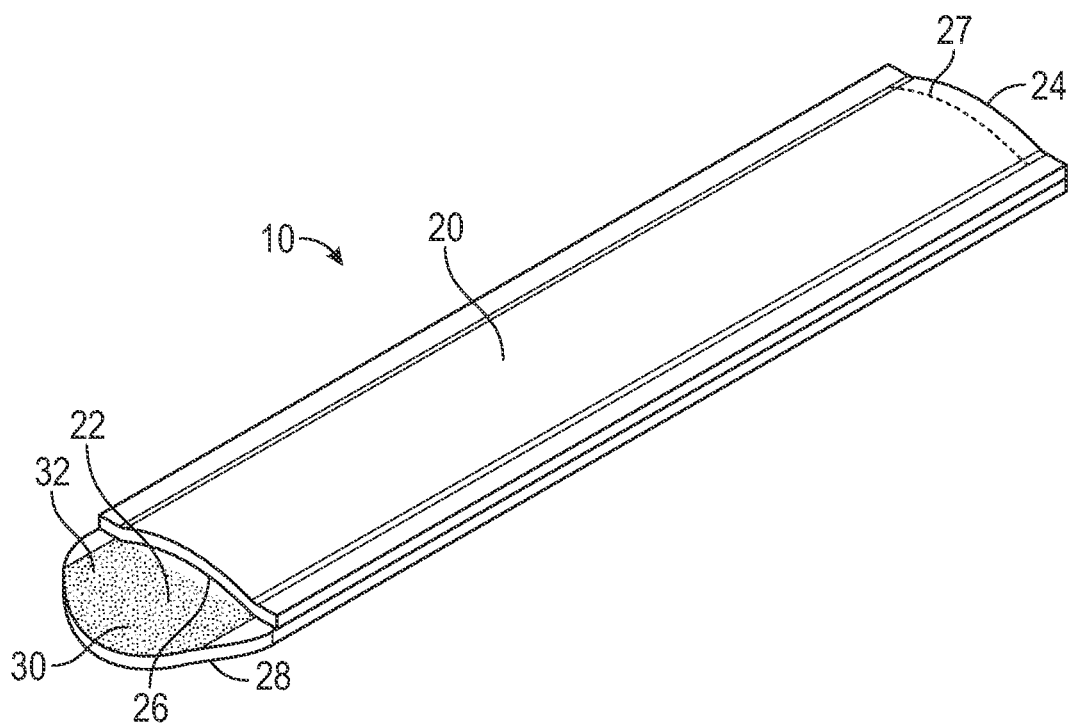
FIG. 1 is a perspective view of a cover constructed in accordance with the inventive concepts disclosed herein.

In the following detailed description of embodiments of the inventive concepts, numerous specific details are set forth in order to provide a more thorough understanding of the inventive concepts. However, it will be apparent to one of ordinary skill in the art that the inventive concepts disclosed and claimed herein may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a non-exclusive inclusion. For example, a process, method, article, or apparatus that comprises a list of elements or steps is not necessarily limited to only those elements or steps and may include other elements, steps, or features not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Throughout this disclosure and the claims, the terms "about," "approximately," and "substantially" are intended to signify that the item being qualified is not limited to the exact value specified, but includes slight variations or deviations therefrom, caused by measuring error, manufacturing tolerances, stress exerted on various parts, wear and tear, or combinations thereof, for example.

The use of the term "at least one" will be understood to include one as well as any quantity more than one, including but not limited to each of 2, 3, 4, 5, 10, 15, 20, 30, 40, 50, 100, and all integers there between. The term "at least one" may extend up to 100 or 1000 or more, depending on the term to which it is attached; in addition, the quantities of 100/1000 are not to be considered limiting, as higher limits may also produce satisfactory results. Singular terms shall include pluralities and plural terms shall include the singular unless indicated otherwise.

The term "or combinations thereof" as used herein refers to all permutations and/or combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment, although the inventive concepts disclosed herein are intended to encompass all combinations and permutations including one or more features of the embodiments described herein.

Figure 2:
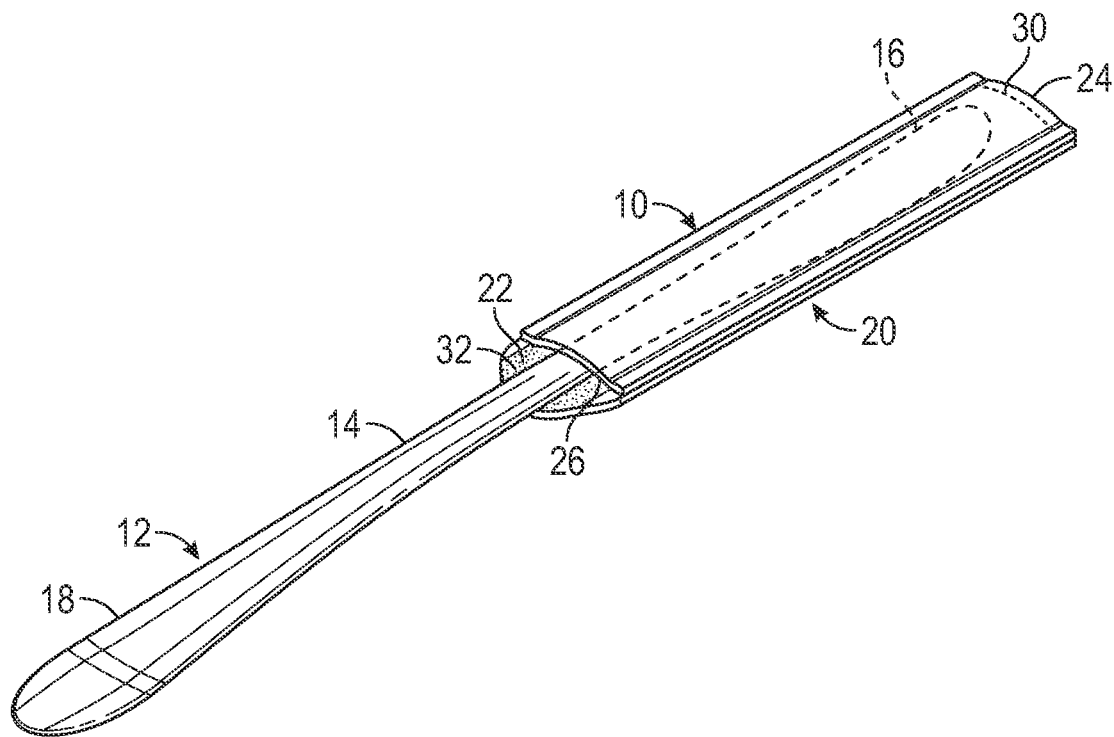
FIG. 2 is a perspective view of the cover of FIG. 1 illustrated with a knife positioned inside the cover.

Referring now to FIGS. 1 and 2, a cover 10 for an eating utensil, such as eating utensil 12, is illustrated. The cover 10 may be used to protect the eating utensil 12 for sanitary purposes. For example, the utensil 12 may be a knife, such as knife 14 (or other types of eating utensils, such as forks and spoons as described below) typically provided to customers for eating food in the restaurant industry. In use, restaurant personnel may place the eating utensil 12 in the cover 10 and then wrap the covered eating utensil 12 in a napkin (not shown). This allows a customer seated at a table to unwrap the eating utensil 12, place the napkin in their lap, and then place the covered eating utensil 12 on the table without the eating utensil 12 coming into contact with the table. It should be appreciated, however, that the eating utensil 12 (and the eating utensils described regarding FIGS. 3-6) may be any eating utensil known in the art and is not limited to the form associated with the eating utensils typically found in restaurants.

As shown in FIGS. 1 and 2, the eating utensil 12 has a head 16 opposite a handle 18. The cover 10 includes a sleeve 20 and a tab 22. The sleeve 20 has a closed end 24 and an open end 26 for receiving the head 16 of the eating utensil 12. The closed end 26 of the sleeve 20 includes a seam 27 for sealing the sleeve 20. The tab 22 extends from the open end 26 of the sleeve 20. The tab 22 aids with inserting the eating utensil 12 into the open end 26 of the sleeve 20.

The cover 10 may be formed of a variety of materials known in the art suitable for storing eating utensils. By way of the example and not by way of limitation, the cover 10 may be formed of a flexible polymeric sheet material, such as melt-blown micro- and nano-fibers. In this example, a polymer melt may be extruded through nozzles surrounded by blowing glass. This results in randomly deposited fibers that form a nonwoven sheet product. Such sheet products are applicable for filtration and sorbent systems. Melt blowing allows for increased simplicity, productivity, and solvent-free operations. Melt-blown materials described above also allow for increased liquid retention—in some cases, such materials may retain volumes of liquid (including water, oils, and other potential contaminates) several times the weight of the material. The increased sorption efficiency of such melt-blown nonwovens may also increase the hygiene efficiency of the material. Furthermore, melt-blown nonwovens may be formed from PHB (Polyhydroxybutyrate), which is biodegradable. The material may have varying thicknesses. In one embodiment, the material is between about 1/16 inches and about 1/32 inches thick.

The tab 22 of the cover 10 is characterized as having an outer surface 28 and an inner surface 30. The inner surface 30 of the tab 22 may be coated with an adhesive 32, such as a polymer-based adhesive. The addition of the adhesive 32 aids in maintaining contact between the cover 10 and the handle 18 of the eating utensil 12. In this way, the cover 10 may remain on the eating utensil 12 until the user releases the tab 22 from the handle 18 and removes the head 16 from the sleeve 20 by pulling on the handle 18.

Cover 10 may also be formed in a variety of sizes and shapes known in the art. One having ordinary skill in the art should appreciate that the size of the cover 10 depends on the size of the eating utensil used. For example, the sleeve 20 of the cover 10 for the knife 14 is substantially rectangular shaped. The sleeve 20 may be, but is not limited to being, between about 3.0 and about 7.0 inches long and about 0.5 and about 2.0 inches wide. In one example, the sleeve 20 for the knife 14 is about 4.5 inches long and about 1.0 inches wide. The tab 22 may also be formed of a variety of shapes and sizes. In the example described above, the tab 22 extends about 0.5 inches from the open end 26 of the sleeve 20. The tab 22 may have squared, rounded, or some other shaped edges. The sleeve 20 may be formed from a single sheet of tubular material with one end closed or from two sheets of material secured to one another as shown. As shown in FIGS. 1-2, the tab 22 has rounded edges and is formed of a substantially semi-circular shape.

Figure 3:
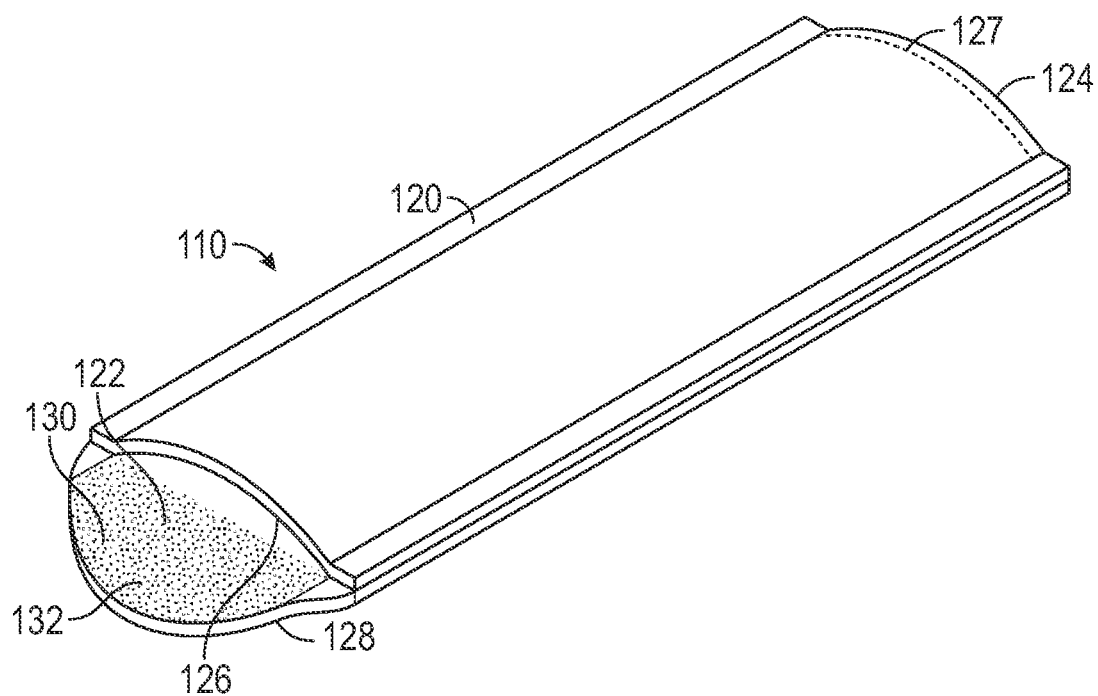
FIG. 3 is a perspective view of another embodiment of a cover constructed in accordance with the inventive concepts disclosed herein.
Figure 4:
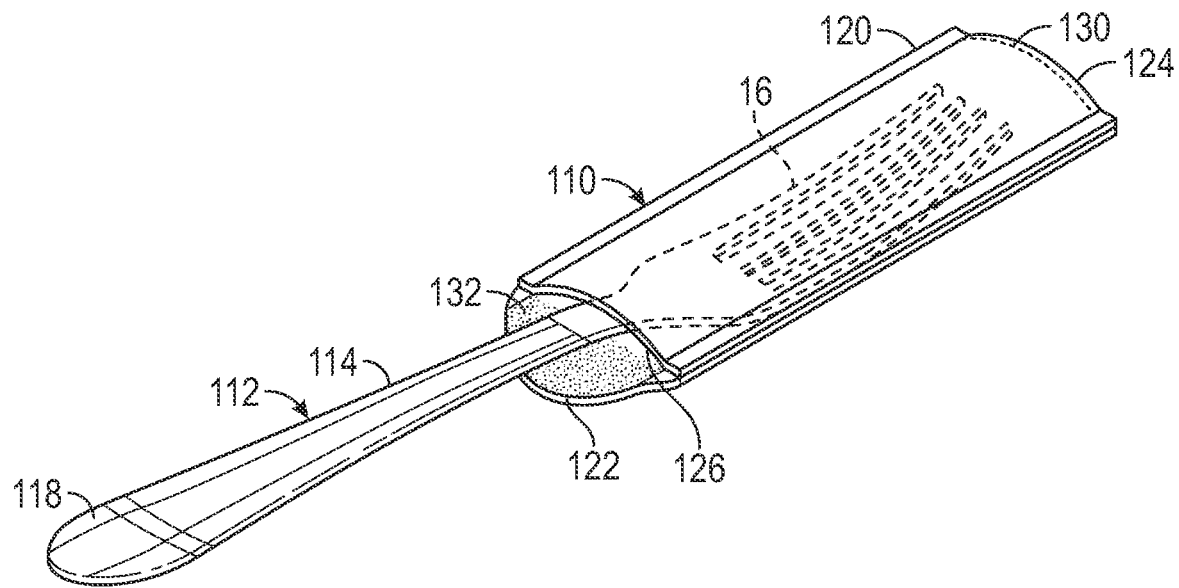
FIG. 4 is a perspective view of the cover of FIG. 3 illustrated with a fork positioned inside the cover.

Referring now to FIGS. 3-4, another embodiment of a cover 110 for an eating utensil 112 is illustrated. The eating utensil 112 may be a fork, such as a fork 114 shown in FIG. 4. The eating utensil 112 has a head 116 opposite a handle 118. The cover 110 includes a sleeve 120 and a tab 122. The sleeve 120 has a closed end 124 and an open end 126 for receiving the head 116 of the eating utensil 112. The closed end 126 of the sleeve 120 includes a seam 127 for sealing the sleeve 120. The tab 122 extends from the open end 126 of the sleeve 120. The tab 122 aids with inserting the eating utensil 112 into the open end 126 of the sleeve 120.

The cover 110 (including the sleeve 120 and the tab 122) is formed of substantially the same material as the cover 10. It should be appreciated, however, that size and dimensions of the cover 110 substantially correspond to the size and dimensions of a fork, such as the fork 114. For example, the sleeve 120 of the cover 110 for the fork 114 is substantially rectangular shaped. The sleeve 120 may be, but is not limited to being, between about 2.5 and about 6.5 inches long and about 0.5 and about 3.0 inches wide. In one example, the sleeve 120 for the fork 114 is about 3.75 inches long and about 1.375 inches wide. In this example, the tab 122 extends about 0.5 inches from the open end 126 of the sleeve 120. The tab 122 may have squared, rounded, or some other shaped edges. The sleeve 120 may be formed from a single sheet of tubular material with one end closed or from two sheets of material secured to one another as shown. As shown in FIGS. 3-4, the tab 122 has rounded edges and is formed of a substantially semi-circular shape.

The tab 122 of the cover 110 is characterized as having an outer surface 128 and an inner surface 130. The inner surface 130 of the tab 122 may be coated with an adhesive 132, such as a polymer-based adhesive. The addition of the adhesive 132 aids in maintaining contact between the cover 110 and the handle 118 of the eating utensil 112. In this way, the cover 110 may remain on the eating utensil 112 until the user releases the tab 122 from the handle 118 and removes the head 116 from the sleeve 120 by pulling on the handle 118.

Figure 5:
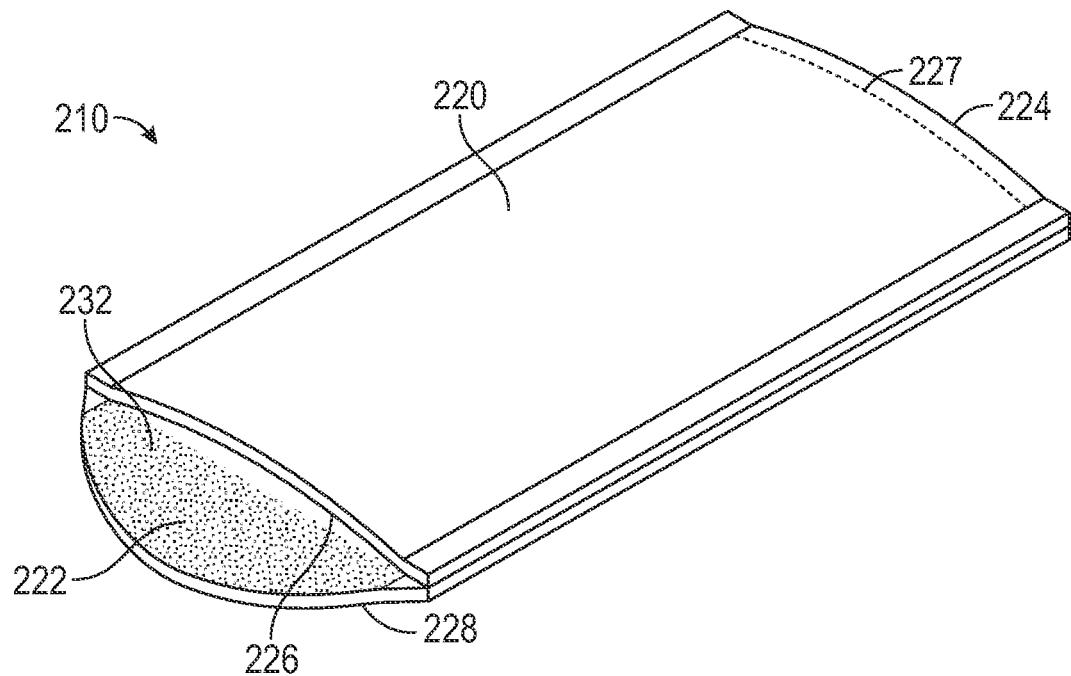
FIG. 5 is a perspective view of another embodiment of a cover constructed in accordance with the inventive concepts disclosed herein.
Figure 6:
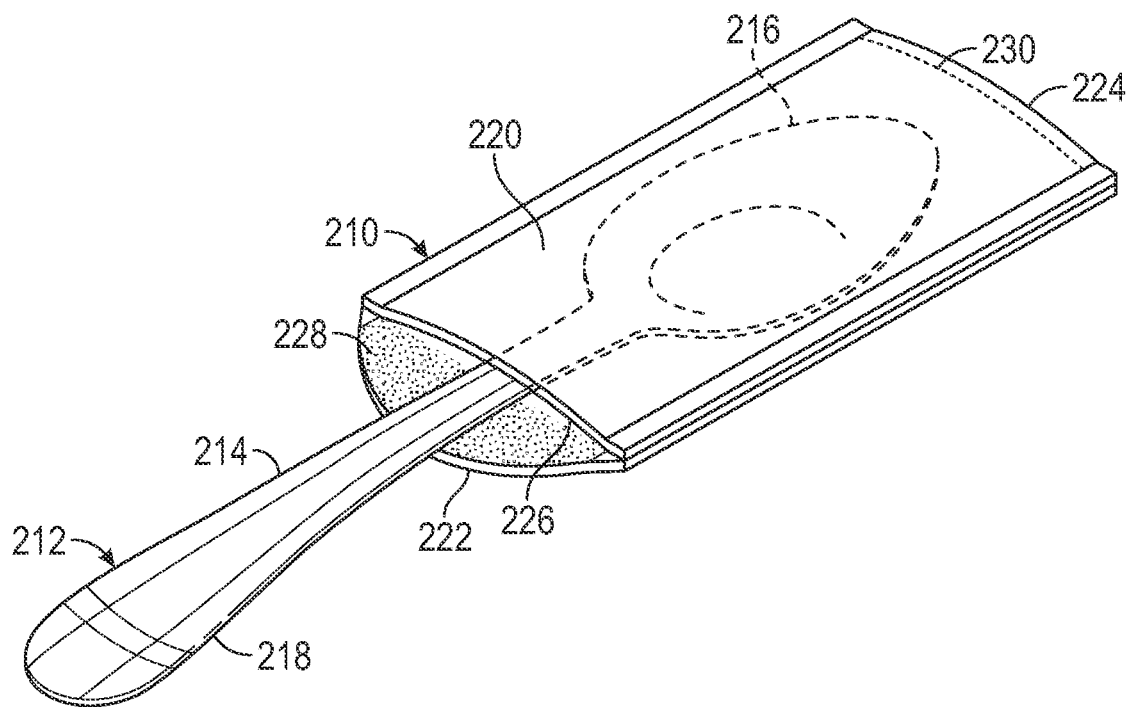
FIG. 6 is a perspective view of the cover of FIG. 5 illustrated with a spoon positioned inside the cover.

Referring now to FIGS. 5-6, another embodiment of a cover 210 for an eating utensil 212 is illustrated. The eating utensil 212 may be a spoon, such as a spoon 214 shown in FIG. 6. The eating utensil 214 has a head 216 opposite a handle 218. The cover 210 includes a sleeve 220 and a tab 222. The sleeve 220 has a closed end 224 and an open end 226 for receiving the head 216 of the eating utensil 212. The closed end 226 of the sleeve 220 includes a seam 227 for sealing the sleeve 220. The tab 222 extends from the open end 226 of the sleeve 220. The tab 222 aids a user in inserting the eating utensil 212 into the open end 226 of the sleeve 220.

The cover 210 (including the sleeve 220 and the tab 222) is formed of substantially the same material as the cover 10. It should be appreciated, however, that size and dimensions of the cover 210 substantially correspond to the size and dimensions of a spoon, such as the spoon 214. For example, the sleeve 220 of the cover 210 for the spoon 214 is substantially rectangular shaped. The sleeve 220 may be, but is not limited to being, between about 2.0 and about 5.5 inches long and about 0.75 and about 4.25 inches wide. In one example, the sleeve 220 for the fork 214 is about 3.50 inches long and about 1.875 inches wide. In this example, the tab 222 extends about 0.5 inches from the open end 226 of the sleeve 220. The tab 222 may have squared, rounded, or some other shaped edges. The sleeve 220 may be formed from a single sheet of tubular material with one end closed or from two sheets of material secured to one another as shown. As shown in FIGS. 5-6, the tab 222 has rounded edges and is formed of a substantially semi-circular shape.

The tab 222 of the cover 210 is characterized as having an outer surface 228 and an inner surface 230. The inner surface 230 of the tab 222 may be coated with an adhesive 232, such as a polymer-based adhesive. The addition of the adhesive 228 aids in maintaining contact between the cover 210 and the handle 218 of the eating utensil 212. In this way, the cover 210 may remain on the eating utensil 212 until the user releases the tab 222 from the handle 218 and removes the head 216 from the sleeve 220 by pulling on the handle 218.

A method of positioning a cover, such as cover 210, on and off of an eating utensil, such as eating utensil 212 will now be described. This method is applicable to covers 10 and 110. First, a user holds the tab 222 of the cover 210. The user also holds the handle 218 of the eating utensil 212. The user then slides the head 216 of the eating utensil 212 in the open end 226 of the sleeve 220 until the head 218 reaches the closed end 224 of the sleeve 220. An adhesive on the tab 222 may hold the cover 210 in place on the handle 218. To remove the eating utensil 212 from the cover 210, the user lifts the tab 222 from the handle 218 and the slides the eating utensil 212 out of the sleeve 220. The cover 210 may then be positioned on a surface, such as a table, and the eating utensil 212 may in turn be positioned on the cover 210 so the eating utensil is not in direct contact with the surface.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A cover in combination with an eating utensil comprising:
    the eating utensil comprises a head and a handle opposite the head;
    the cover comprising:
        a sleeve having a closed end and an open end opposite the closed end, the head of the eating utensil disposed in the sleeve with the handle extending from the open end, the sleeve consisting of a flexible, polymeric sheet material formed of non-woven micro-fibers and nano-fibers; and
        a tab extending from the open end of the sleeve, the tab has an outer surface and an inner surface, the tab consisting of a flexible, polymeric sheet material formed of non-woven micro-fibers and nano-fibers, and an adhesive disposed on the inner surface of the tab, a portion of the handle extends over the tab, the tab is adhered to the portion of the handle extending over the tab.

2. The combination of claim 1, wherein the tab is semi-circularly shaped.

3. The combination of claim 1, wherein the eating utensil is a spoon.

4. The combination of claim 1, wherein the eating utensil is a fork.

5. The combination of claim 1, wherein the eating utensil is a knife.

* * * * *